United States Patent
Hashimoto

(10) Patent No.: US 6,407,824 B1
(45) Date of Patent: *Jun. 18, 2002

(54) IMAGE PROCESSING AND OUTPUTTING WITH SUSPENSION OF PROCESSING IN A WHITE REGION

(75) Inventor: Yasunori Hashimoto, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/897,547

(22) Filed: Jul. 21, 1997

(30) Foreign Application Priority Data

Jul. 25, 1996 (JP) .............................. 8-196186
May 20, 1997 (JP) .............................. 9-129559

(51) Int. Cl.⁷ .............................................. G06K 15/00
(52) U.S. Cl. ....................................... 358/1.9; 358/1.13
(58) Field of Search ................................ 395/101, 102, 395/109, 112, 116; 358/298, 428, 429, 448, 443, 455, 456, 458, 459, 461, 465, 502, 518, 521, 525, 530, 533, 534, 1.1, 1.2, 1.9, 1.13, 1.17, 1.6, 1.14, 1.15, 1.18, 447, 453, 464, 467, 468, 486, 516, 517, 519, 538, 540; 382/237, 252, 299, 162, 164, 165, 167, 175, 176, 180, 224, 274, 282, 283, 307

(56) References Cited

U.S. PATENT DOCUMENTS

| | | | | |
|---|---|---|---|---|
| 3,873,761 A | * | 3/1975 | Bigelow et al. | 358/486 |
| 5,111,218 A | * | 5/1992 | Lebeau et al. | 347/240 |
| 5,588,069 A | | 12/1996 | Katayama et al. | 382/166 |
| 5,650,861 A | | 7/1997 | Nakajima et al. | 358/433 |
| 5,727,137 A | * | 3/1998 | LeClair et al. | 395/116 |
| 5,822,510 A | * | 10/1998 | LeClair et al. | 395/115 |
| 5,870,503 A | * | 2/1999 | Kumashiro | 382/252 |
| 5,877,865 A | * | 3/1999 | Fukuta | 358/296 |

* cited by examiner

Primary Examiner—Dov Popovici
(74) Attorney, Agent, or Firm—Fitzpatrick, Cella, Harper & Scinto

(57) ABSTRACT

In a color image processing apparatus including a printer unit for printing out image data, it is checked whether the image represented by image data to be processed includes a white region, and image processing is performed while processing to be executed is changed in accordance with the determination result. Upon printing, the printer unit prints out the image data while skipping a region determined as a white region.

19 Claims, 14 Drawing Sheets

IMAGE PROCESSING AND OUTPUTTING WITH SUSPENSION OF PROCESSING IN A WHITE REGION

BACKGROUND OF THE INVENTION

1. Field of the Invention

The present invention relates to an image processing apparatus and method which can output a color image by performing predetermined image processing for input image data.

2. Background of the Invention

FIG. 11 is a block diagram showing an example of the arrangement of a conventional color image processing apparatus. The operation of the conventional color image processing apparatus will be described below with reference to FIG. 11.

Referring to FIG. 11, reference numeral 101 denotes an image sensing device such as a CCD or the like which outputs red, green, and blue (to be respectively referred to as R, G, and B hereinafter) analog signals by scanning an original; 102, an A/D converter for converting the analog signals output from the image sensing device 101 into corresponding digital signals; and 1001, a luminance/density conversion processing unit for performing luminance/density conversion processing for the R, G, and B image data output from the A/D converter 102 and outputting cyan, magenta, and yellow (to be respectively referred to as C, M, and Y hereinafter) signals.

Reference numeral 1002 denotes a masking processing unit for performing masking processing for the image data output from the luminance/density conversion processing unit 1001; 1003, a density correction processing unit for performing density correction processing for the image data output from the masking processing unit 1002; 1004, a magnifying processing unit for performing magnifying processing for the image data output from the density correction processing unit 1003; and 1005, an error diffusion processing unit for converting the multivalued C, M, and Y image data output from the magnifying processing unit 1004 into binary C, M, and Y signals by performing error diffusion processing for the multivalued data.

Reference numeral 105 denotes an ink-jet printer for printing out the image represented by the binary C, M, and Y signals output from the error diffusion processing unit 1005; 106, a CPU for controlling the respective components of this color image processing apparatus; 107, a RAM connected to the CPU 106 and used as a work area; and 108, a ROM connected to the CPU 106 and used to store instruction codes representing the procedure of processing executed by the CPU 106.

FIG. 12 is a flow chart showing the procedure of the color copying operation of the conventional color image processing apparatus having the arrangement shown in FIG. 11. The conventional color copying operation will be described below with reference to FIG. 12.

First of all, the image sensing device 101 scans an original to output analog signals (step S1101). The A/D converter 102 then converts the analog signals into digital signals (step S1102). The image data converted into the digital signals are subjected to conversion from R, G, and B luminance signals into C, M, and Y density signals (step S1103). This luminance/density conversion is performed for each color by looking up a table. FIG. 5 shows general characteristics stored in the table. Referring to FIG. 5, the abscissa represents the input luminance level; and the ordinate, the output density level.

Subsequently, the image data having a color space complying with the characteristics of the image sensing device are converted into data having a color space complying with the characteristics of the ink-jet printer by masking processing (step S1104).

If C, M, and Y data respectively represent input image values, and C', M', and Y' data respectively represent output image values, a computation for masking processing is performed according to the following equation:

$$\begin{pmatrix} C' \\ M' \\ Y' \end{pmatrix} = \begin{pmatrix} a_{11} & a_{12} & a_{13} \\ a_{21} & a_{22} & a_{23} \\ a_{31} & a_{32} & a_{33} \end{pmatrix} \times \begin{pmatrix} C \\ M \\ Y \end{pmatrix} \quad (1)$$

In addition, to comply with the characteristics of the ink-jet printer 105, density correction processing is performed for each of the colors, C, M, and Y, by looking up a table (step S1105). FIG. 6 shows general characteristics stored in the table. Referring to FIG. 6, the abscissa represents the input level; and the ordinate, the output level. The resultant data are subjected to magnifying processing to be converted from the resolution of the image sensing device 101 into the resolution of the ink-jet printer 105 (step S1106). If, for example, the resolution of the image sensing device 101 is 300 dpi, and the resolution of the ink-jet printer 105 is 720 dpi, the data is magnified 2.4×.

Linear interpolation used for this magnifying processing will be described below.

FIG. 4 shows the relationship between pixels before conversion and a pixel after conversion in the linear interpolation method. Referring to FIG. 4, pixels V, W, X, and Y are the pixels before conversion, and the luminance levels of the respective pixels are represented by v, w, x, and y. A pixel P is the pixel after conversion. The positional relationship between the pixel P and the pixels before conversion is set such that the pixel P is located at a distance La from the pixel V and a distance Lb from the pixel W in the main scanning direction (horizontal direction in FIG. 4), and is also located at a distance Ka from the pixel V and a distance Kb from the pixel X in the sub-scanning direction (vertical direction in FIG. 4). A luminance level p of the pixel P in FIG. 4 is therefore given by:

$$p = \frac{v \times Lb \times Kb + w \times La \times Kb + x \times Lb \times Ka + y \times La \times Ka}{(La + Lb) \times (Ka + Kb)} \quad (2)$$

The multivalued C, M, and Y signals are converted into binary signals by an error diffusion process to be output from the ink-jet printer 105 (step S1107). Finally, the binary C, M, and Y signals are output from the ink-jet printer 105 (step S1108), and the color copying operation of this color image processing apparatus is ended.

As a technique of implementing the above prior art, a technique of performing all color image processes by hardware may be used. In this case, however, the hardware size becomes large, and the hardware cost becomes high.

As another technique, a technique of performing the above color image processing by software may be used. In this case, however, the image processing speed is low.

SUMMARY OF THE INVENTION

The present invention has been made in consideration of the above prior art, and has as its object to provide an image processing apparatus and method which can perform both image processing and image printing processing at high speeds.

To achieve the above object, one preferred embodiment of the present invention discloses an image processing apparatus comprising: white region determination means for determining the presence/absence of a white region in an image represented by image data to be processed; image processing means for performing image processing while executing different processes for a region determined as a white region by the white region determination means and a region other than the white region; and printout means for printing out an image processed by the image processing means, the printout means printing out the image while skipping the white region.

It is another object of the present invention to provide an image processing apparatus and method which can perform image processing and image printing processing at high speeds.

To achieve the above object, one preferred embodiment of the present invention discloses an image processing apparatus for performing image processing for input image data and causing predetermined print means to perform print processing, comprising: determination means for determining the presence/absence of a white region in an image represented by the input image data in units of predetermined unit regions; control means for omitting execution of at least one of general image processes for a region determined as a white region by the determination means; and output means for outputting, to the predetermined print means, information indicating that execution of the image process is omitted by the control means.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

First Embodiment

The first embodiment of the present invention will be described in detail below with reference to the accompanying drawings.

Figure 1:
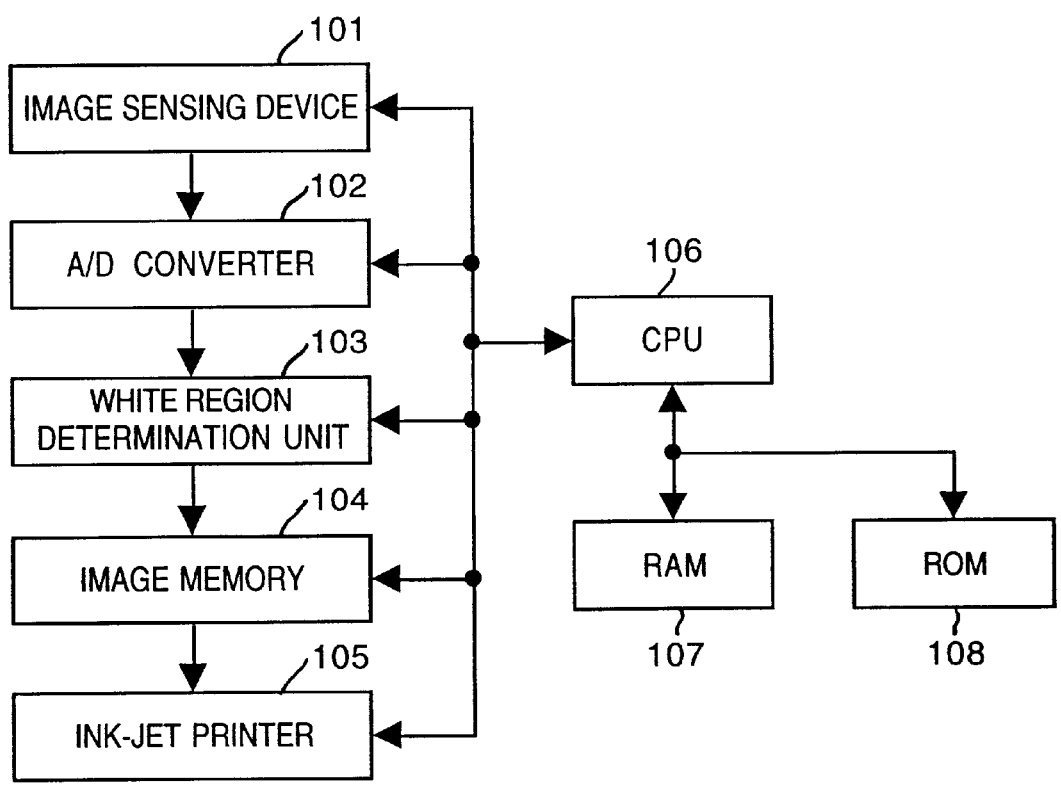
FIG. 1 is a block diagram showing a color image processing apparatus according to the first embodiment of the present invention.

FIG. 1 is a block diagram showing the arrangement of a color image processing apparatus according to the first embodiment of the present invention.

Referring to FIG. 1, reference numeral 101 denotes an image sensing device for outputting R, G, and B analog signals by scanning an original; 102, an A/D converter for converting the analog signals output from the image sensing device 101 into corresponding digital signals; 103, a white region determination unit for determining the presence/absence of a white region in the image represented by the image signals output from the A/D converter 102; 104, an image memory for storing the image signals output from the white region determination unit 103; 105, an ink-jet printer for printing out the color image represented by the image signals stored in the image memory 104; 106, a CPU for controlling each component of the color image processing apparatus of this embodiment and performing overall control; 107, a RAM connected to the CPU 106 and used as a work area; and 108, a ROM connected to the CPU 106 and used to store instruction codes executed by the CPU 106.

Figure 2:
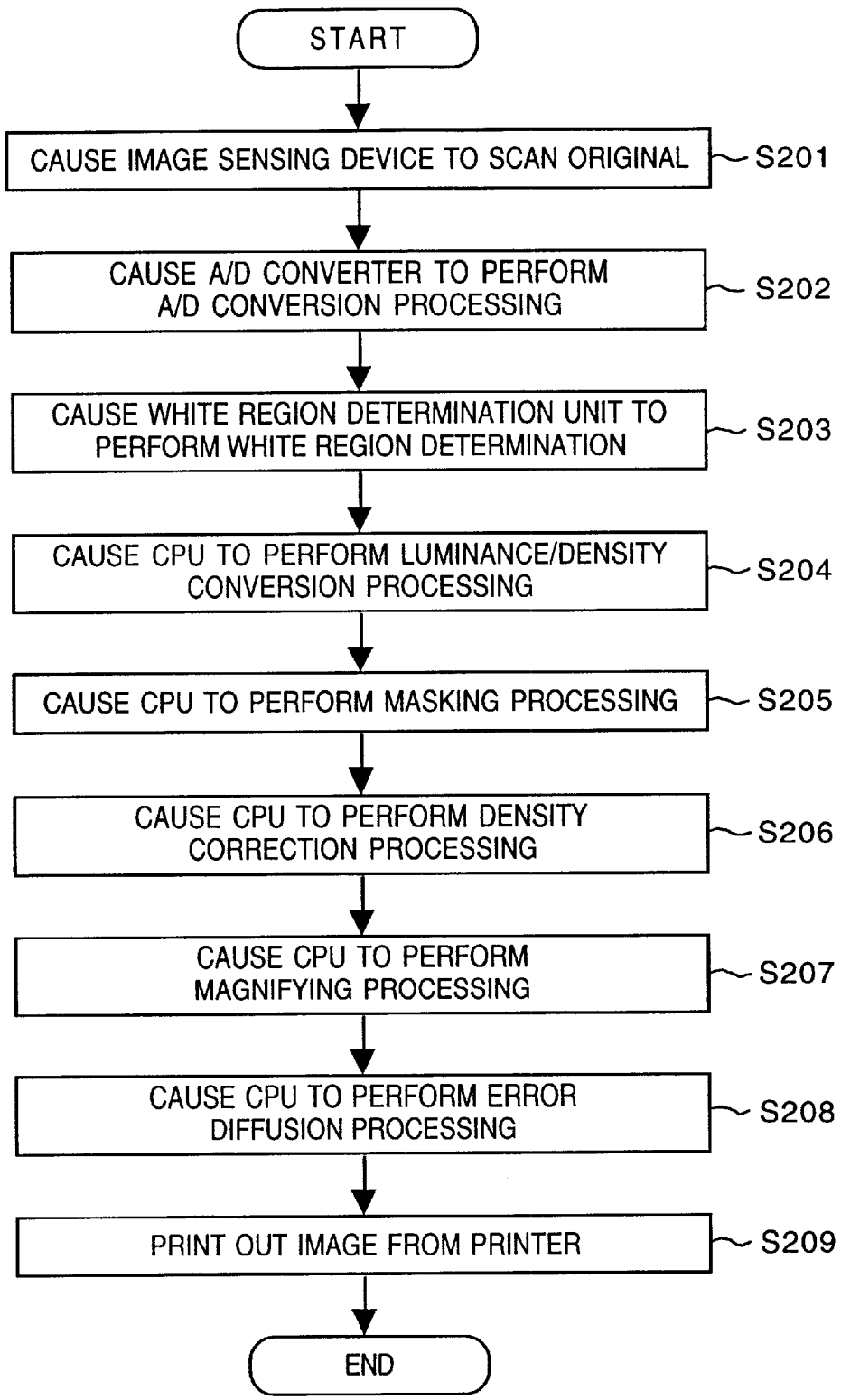
FIG. 2 is a flow chart showing the operation of the color image processing apparatus according to the first embodiment.

FIG. 2 is flow chart showing the procedure of the color copying operation of the color image processing apparatus in FIG. 1. This copying operation will be described below.

First of all, the image sensing device 101 scans an original to read an original image, and outputs the read information as analog signals (step S201). The A/D converter 102 then converts the analog signals into corresponding digital signals (step S202). The presence/absence of a white region in the image represented by the converted digital signals is then determined (step S203). White region determination is performed by one of the following methods 1 to 4:

1. Determination is performed in units of predetermined rectangular regions.

2. Determination is performed in units of arbitrary rectangular regions.

3. Determination is performed in units of lines in the main scanning direction.

4. Determination is performed in units of line portions in the main scanning direction.

Figure 3:
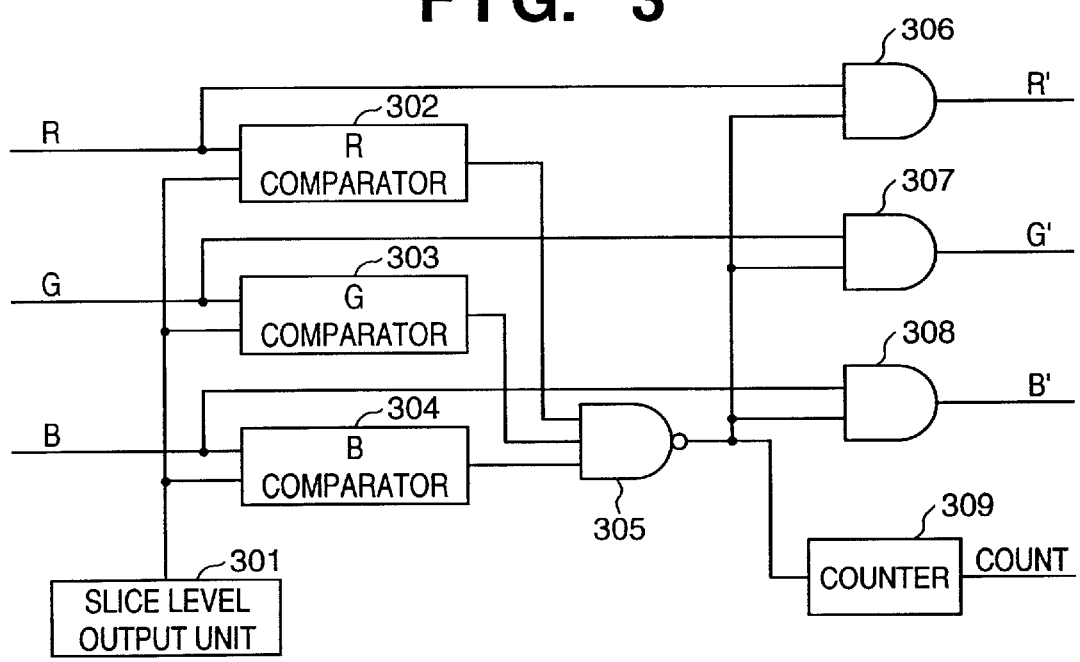
FIG. 3 is a block diagram showing the arrangement of a white region determination unit.

The white region determination unit 103 in FIG. 1 determines whether each pixel is white. FIG. 3 shows the detailed arrangement of the white region determination unit 103.

Referring to FIG. 3, reference numeral 301 denotes a slice level output unit for outputting a slice level as a criterion for determining a white region; and 302, an R comparator for comparing the input R signal level with the output from the slice level output unit 301. If the R signal level is lower than the slice level output from the slice level output unit 301, the R comparator 302 outputs a high-level signal. If the R signal level is higher than the slice level, the R comparator 302 outputs a low-level signal.

Reference numeral 303 denotes a G comparator for comparing the G signal level with the slice level, similar to the R comparator 302; 304, a B comparator for comparing the B signal level with the slice level; 305, an AND gate for calculating the OR of outputs from the comparators 302, 303, and 304 and outputs a low-level signal when all the outputs from the comparators are at high level; 306, an AND gate for calculating the OR of the R signal and the output from the AND gate 305; 307, an AND gate for calculating the OR of the G signal and the output from the AND gate 305; and 308, an AND gate for calculating the OR of the B signal and the output from the AND gate 305.

With the above arrangement, if the output from the AND gate 305 is at high level, i.e., it is determined that the target pixel is not white, the R, G, and B signals are output from the AND gates 306, 307, and 308 without any change in level. If, however, the output form the AND gate 305 is at low level, i.e., it is determined that the target pixel is white, all the outputs are set at low level.

Reference numeral 309 denotes a counter which is incremented when the output from the AND gate 305 is at low level. White region determination is performed on the basis of the count result.

In the image memory 104 shown in FIG. 1, the R, G, and B image data output from the A/D converter 102 are stored, together with pieces of information indicating white regions.

These pieces of information indicating the white regions are stored in the following forms. In method 1, a table for storing determination results corresponding to the respective rectangular regions is prepared, and white determination results are stored in this table. In method 2, each information is represented by a set of diagonal coordinates of each rectangular region determined as a white region. In method 3, a table for storing determination results corresponding to the respective lines is prepared, and white determination results are stored in thin stable. In method 4, each information is represented by a set of data indicating a specific line and data indicating specific pixels, on the specific line, for which a white region is determined.

FIG. 2 will be referred to again to describe the processing in step S204 and the subsequent steps. Image processing performed by the CPU 106 with respect to the image data stored in the image memory 104 will be described. Image processing for image data which is not determined as a white region will be described first.

Figure 5:
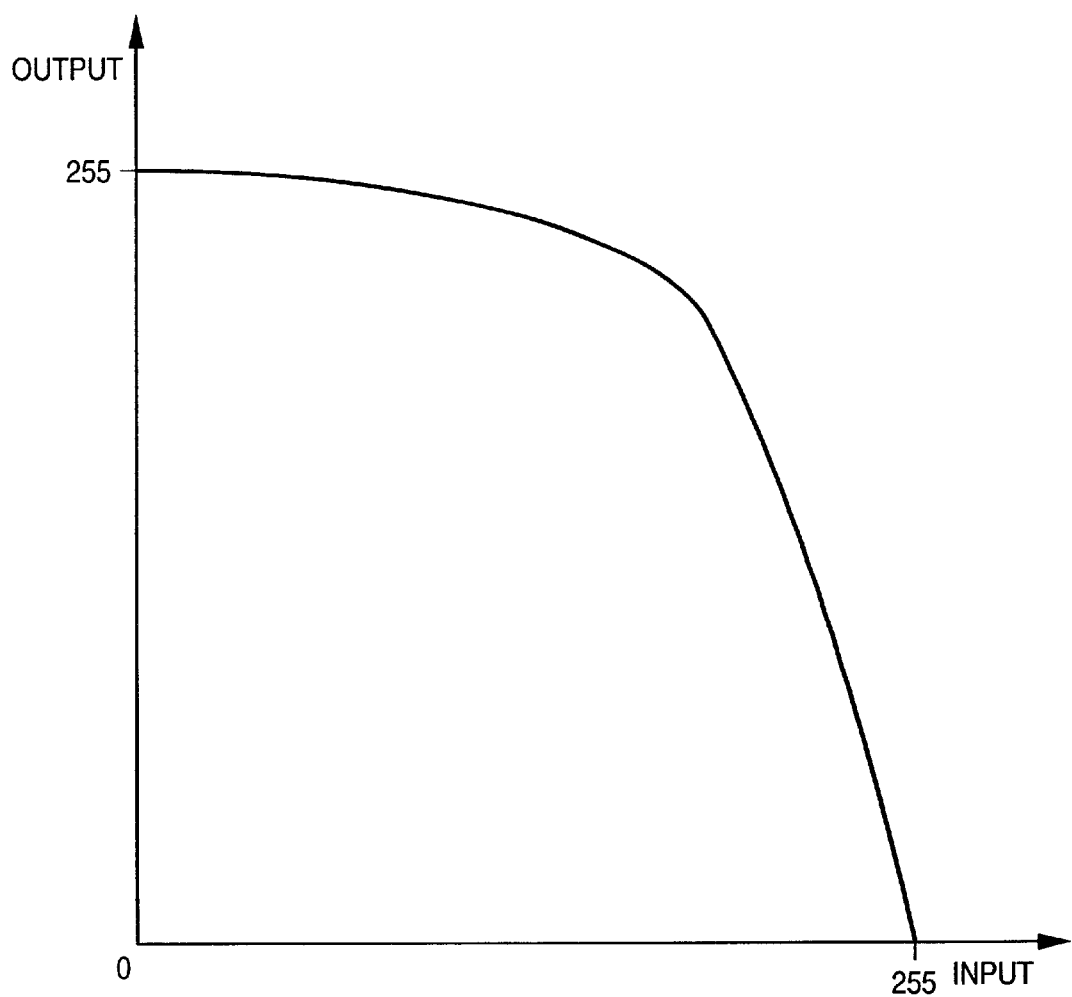
FIG. 5 is a graph showing the characteristics of a luminance/density conversion table.

First of all, R, G, and B luminance signals are converted into C, M, and Y density signals (step S204). Luminance/density conversion is performed for each color by referring to a table. FIG. 5 shows an example of the characteristics stored in the table. Referring to FIG. 5, the abscissa represents the input luminance level; and the ordinate, the output density level. Masking processing is then performed for the image data having a color space complying with the characteristics of the image sensing device to comply with the color characteristics of the ink-jet printer 105 (step S205). provided that C, M, and Y data respectively represent input image values, and C', M', and Y' data respectively represent output image values, a computation for masking processing is performed according to the following equation:

$$\begin{pmatrix} C' \\ M' \\ Y' \end{pmatrix} = \begin{pmatrix} b_{11} & b_{12} & b_{13} \\ b_{21} & b_{22} & b_{23} \\ b_{31} & b_{32} & b_{33} \end{pmatrix} \times \begin{pmatrix} C \\ M \\ Y \end{pmatrix} \quad (3)$$

Figure 6:
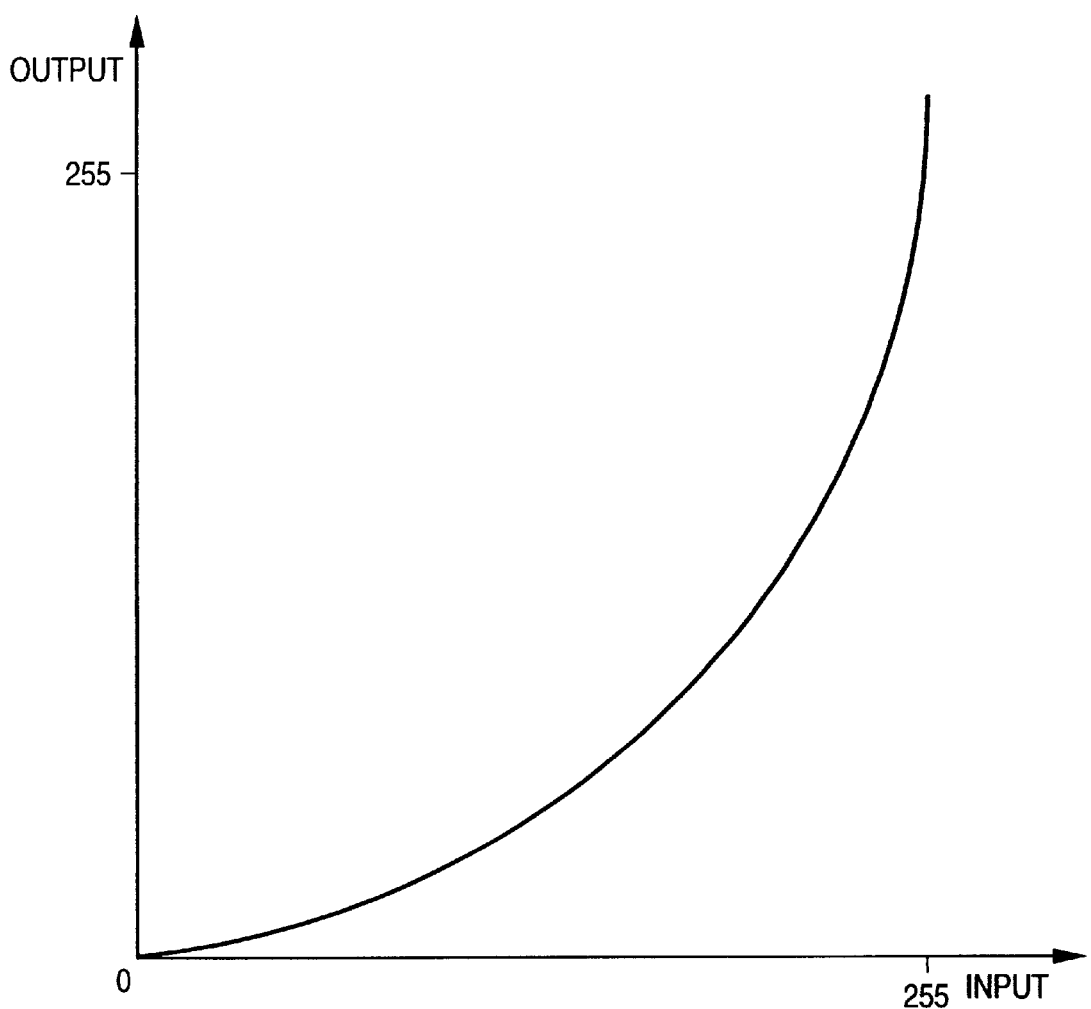
FIG. 6 is a graph showing the characteristics of a density correction processing table.

In order to comply with the characteristics of the ink-jet printer 105, density correction processing is performed for each of the colors, C, M, and Y, by looking up a table (step S206). FIG. 6 shows an example of the characteristics stored in the table. Referring to FIG. 6, the abscissa represents the input level; and the ordinate, the output level. The resultant data are subjected to magnifying processing to be converted from the resolution of the image sensing device 101 into the resolution of the ink-jet printer 105 (step S207). If, for example, the resolution of the image sensing device is 300 dpi, and the resolution of the ink-jet printer is 720 dpi, the data is magnified 2.4×. The magnifying processing is performed by using the linear interpolation method.

Figure 4:
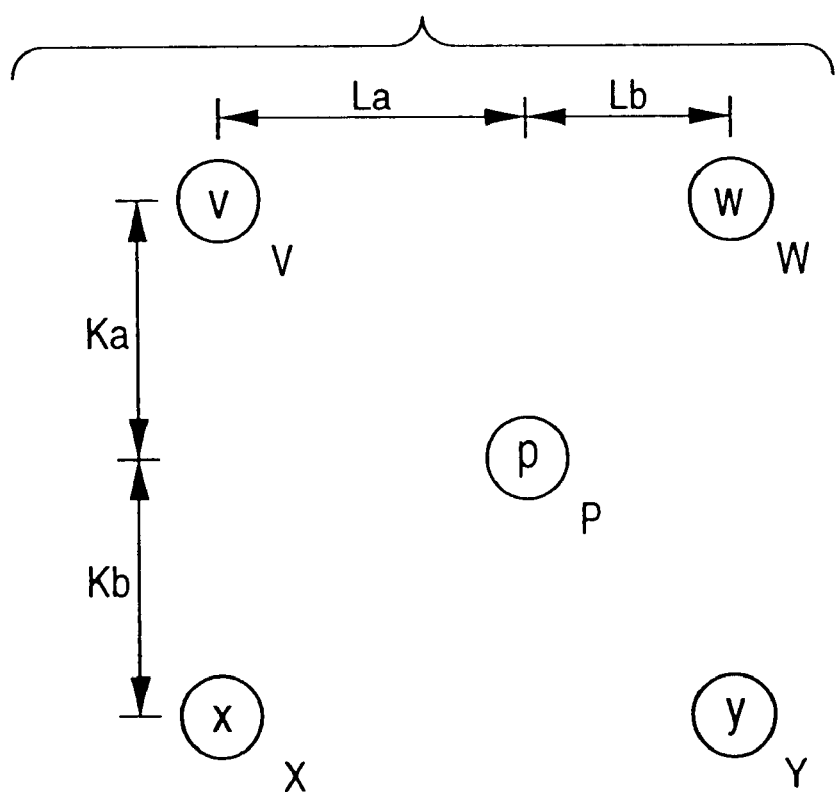
FIG. 4 is a view showing the relationship between the pixels before conversion and the pixel after conversion by linear interpolation.

FIG. 4 shows the relationship between pixels before conversion and a pixel after conversion in the linear interpolation method. Referring to FIG. 4, pixels V, W, X, and Y are the pixels before conversion, and the luminance levels of the respective pixels are represented by v, w, x, and y. A pixel P is the pixel after conversion. The positional relationship between the pixel P and the pixels before conversion is set such that the pixel P is located at a distance La from the pixel V and a distance Lb from the pixel W in the main scanning direction (horizontal direction in FIG. 4), and is also located at a distance Ka from the pixel V and a distance Kb from the pixel X in the sub-scanning direction (vertical direction in FIG. 4).

A luminance level p of the pixel P in FIG. 4 is therefore given by equation 2, as in the prior art. The multivalued C, M, and Y signals are converted into binary signals by the error diffusion method to be output from the ink-jet printer 105 (step S208).

Steps S204 to S208 are the processing to be performed for a region which is not a white region. When the target region is determined as a white region, luminance/density conversion processing (step S204) and masking processing (step S205) need not be performed. Density correction processing (step S206), magnifying processing (step S207), and error diffusion processing (step S208) need to be performed as in the case of regions other than white regions. If, however, the image level as a result of density correction processing is almost zero, neither magnifying processing nor error diffusion processing need be performed. For this reason, if white region determination is performed in advance, the above processing can be omitted to reduce the load in image processing. When character data is written on an original, in particular, the overall image processing amount can be greatly reduced by this processing.

Finally, the binary C, M, and Y signals are output from the ink-jet printer 105, and the color copying operation of this color image processing apparatus is ended.

The operation of the ink-jet printer of this embodiment will be described in detail below.

Figure 7:
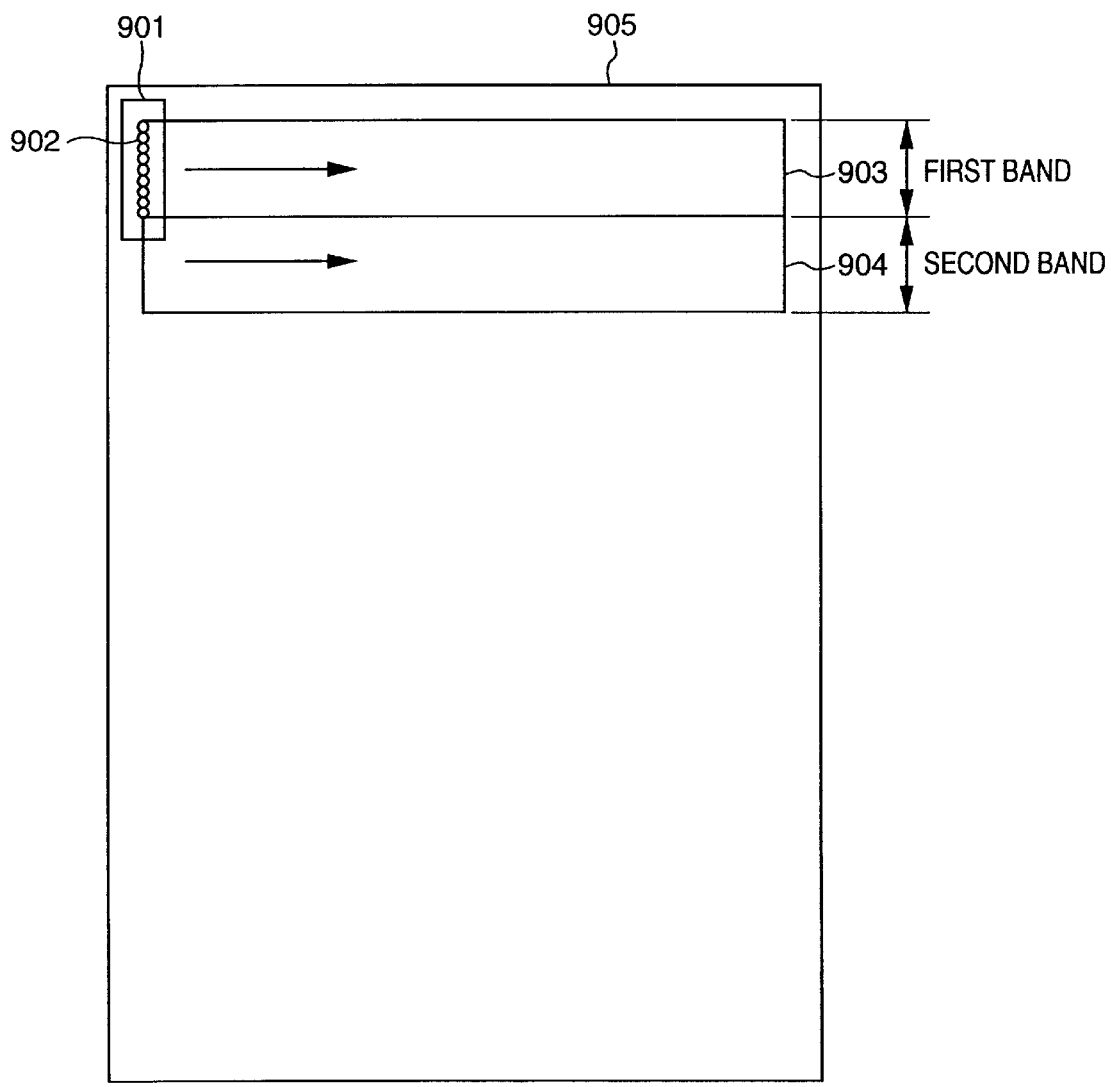
FIG. 7 is view showing the print region of an ink-jet printer.

FIG. 7 shows a method of printing an image by using this printer. Reference numeral 905 denotes a paper sheet on which the image is to be printed. First of all, a print head 901 having a plurality of nozzles 902 prints data in a region 903 (first band) by the first scanning operation, and prints data in a region 904 (second band) by the second scanning operation.

By repeating such an operation, the print head 901 prints a one-page image. An ink-jet printer will be described as such a serial printer.

Figure 8:
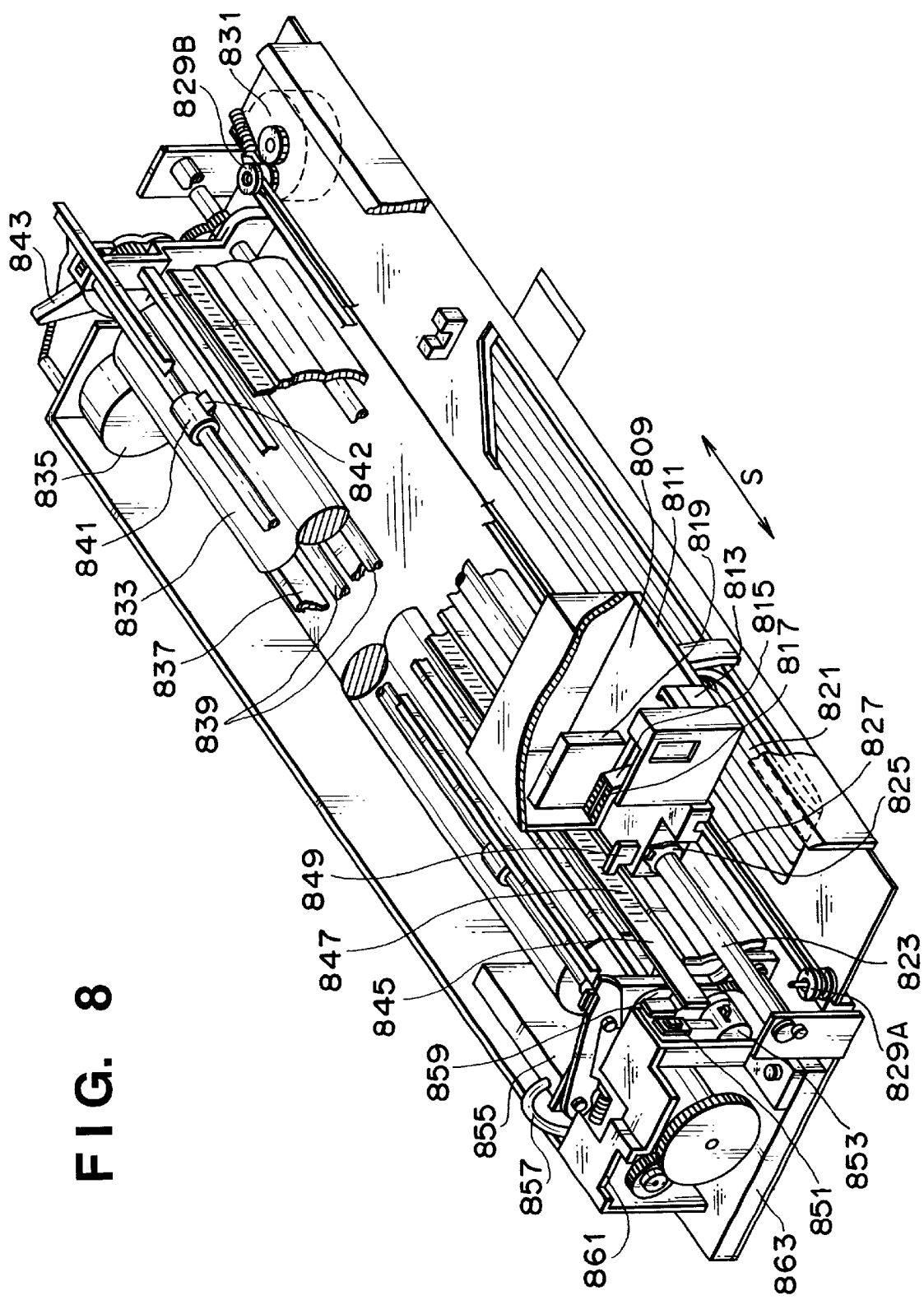
FIG. 8 is a perspective view showing the structure of the ink-jet printer.

Referring to FIG. 8, reference numeral 809 denotes a head cartridge having an ink-jet print head; 811, a carriage having the head cartridge 809 mounted thereon and serving to scan it in a direction S; 813, a hook for attaching the head cartridge 809 to the carriage 811; and 815, a lever for operating the hook 813. The lever 815 has a marker 817 for indicating a graduation marked on a cover (to be described later) to help the user read the print position, the set position, or the like. Reference numeral 819 denotes a support plate for supporting a connector with respect to the head cartridge 809; and 821, a flexible cable for connecting the connector to the main body control unit.

Reference numeral 823 denotes a guide shaft which is used to guide the carriage 811 in the direction S and extends through a bearing 825; and 827, a timing belt to which the carriage 811 is fixed and which is used to transmit a driving force for moving the carriage 811 in the direction S. The timing belt 827 is looped between pulleys 829A and 829B arranged on the two end portions of the apparatus. A driving force is transmitted from a carriage motor 831 to one pulley 829B through a transmission mechanism constituted by gears and the like.

Reference numeral 833 denotes a platen roller for regulating the printing surface of a recording medium such as a paper sheet (to be also referred to as a printing paper hereinafter) and conveying it upon printing. The platen roller 833 is driven by a conveyance motor 835. Reference numeral 837 denotes a paper pan for guiding the recording medium from the paper feed tray side to the print position; and 839, feed rollers arranged midway along the feed path of the recording medium to press the recording medium against the platen roller 833 and convey it.

Reference numeral 841 denotes a paper discharge roller placed on the downstream side of the print position in the recording medium conveyance direction to discharge the recording medium toward the paper discharge port (not shown); 842, a spur which is formed on the paper discharge roller 841 to press the paper discharge roller 841 through the recording medium so as to cause the paper discharge roller 841 to generate a conveying force for the recording medium; and 843, a cancel lever for canceling the biasing forces acting on the feed rollers 839, a press plate 845, and the spur 842 when, for example, the recording medium is to be set.

The press plate 845 prevents the recording medium from floating near the print position and keeps the medium in tight contact with the platen roller 833. In this embodiment, an ink-jet print head for discharging ink to print an image is used as a print head. Therefore, the distance between the orifice formation surface of the print head and the printing surface of the recording medium is relatively small, and must be strictly managed to prevent contact between the recording medium and the orifice formation surface. The press plate 845 is effective for this purpose.

Reference numeral 847 denotes graduations marked on the press plate 845; and 849, a marker placed on the carriage 811 in correspondence with the graduations 847. With the graduations and the marker, the print or set position of the print head can be read. Reference numeral 851 denotes a cap made of an elastic material such as rubber and placed to oppose the orifice formation surface of the print head at the home position. The cap 851 is supported to be brought into contact with/separated from the print head. The cap 851 is used to protect the print head during an idle period or to perform discharge recover processing for the print head.

Discharge recover processing is the process of discharging ink from all the orifices by driving the energy generating elements arranged in the orifices and used to discharge the ink (preliminary discharge), thereby removing the causes of discharge failure, such as ink that becomes unsuitable for a print operation, or the process of forcibly discharging ink from the orifices to remove the causes of discharge failure.

Reference numeral 853 denotes a pump for applying suction to forcibly discharge ink and drawing the ink received in the cap 851 when discharge recovery processing is to be performed by such forcible ink discharge or by preliminary discharge; 855, a waste ink tank for storing the waste ink drawn by the pump 853; and 857, a tube which communicates the pump 853 and the waste ink tank 855 with each other.

Reference numeral 859 denotes a blade for wiping the orifice formation surface of the print head. The blade 859 is supported to be movable between the position where the blade protrudes toward the print head to wipe the orifice formation surface upon movement of the print head and the retreat position where the blade does not engage with the orifice formation surface; 861, a restoration system motor; and 863, a cam unit which receives a driving force from the restoration system motor 861 to drive the pump 853 and move the cap 851 and the blade 859.

The above printer exemplifies the bubble jet printer as a printer for printing out a color image. As is apparent, however, the present invention can be applied to an aero-jet printer designed to discharge ink by using an air flow. It is also obvious that the present invention can be applied to any types of printers as well as ink-jet printers as long as they are serial printers.

In the ink-jet printer which operates in the above manner, when a given band entirely consists of white data, the motor in the sub-scanning direction is driven to skip the band. When a portion of a given band is a white region, the motor in the main scanning direction is driven to skip the portion. Referring to FIG. 7, if, for example, the entire image data input to the ink-jet printer 105 which corresponds to the second band 904 is white data, since no print operation need be performed on the second band, the print head skips from the first band to the third band to print. This skipping operation is controlled in units of bands subjected to white region determination in the ink-jet printer 105.

As described above, according to this embodiment, when the region represented by image data to be processed is determined as a white region, luminance/density conversion processing (step S204) and masking processing (step S205) in FIG. 2 need not be performed. Density correction processing (step S206), magnifying processing (step S207), and error diffusion processing (step S208) need to be performed as in the case of regions other than white regions. If, however, the image level as a result of density correction processing is zero, neither magnifying processing nor error diffusion processing need be performed. For this reason, if white region determination is performed in advance, the above processing can be omitted to reduce the load in image processing. When character data is written on an original, in particular, the overall image processing amount can be greatly reduced by this processing.

In addition, when the image processing unit on the printer side is implemented by software, the size and cost of the apparatus can be reduced. Furthermore, when the ink-jet printer capable of printing an image at a high speed by skipping white regions of the image represented by data having undergone image processing is used, the amount of image processing for the white regions of the image represented by the image data can be reduced to realize a high-speed print operation as a whole.

Second Embodiment

Figure 9:
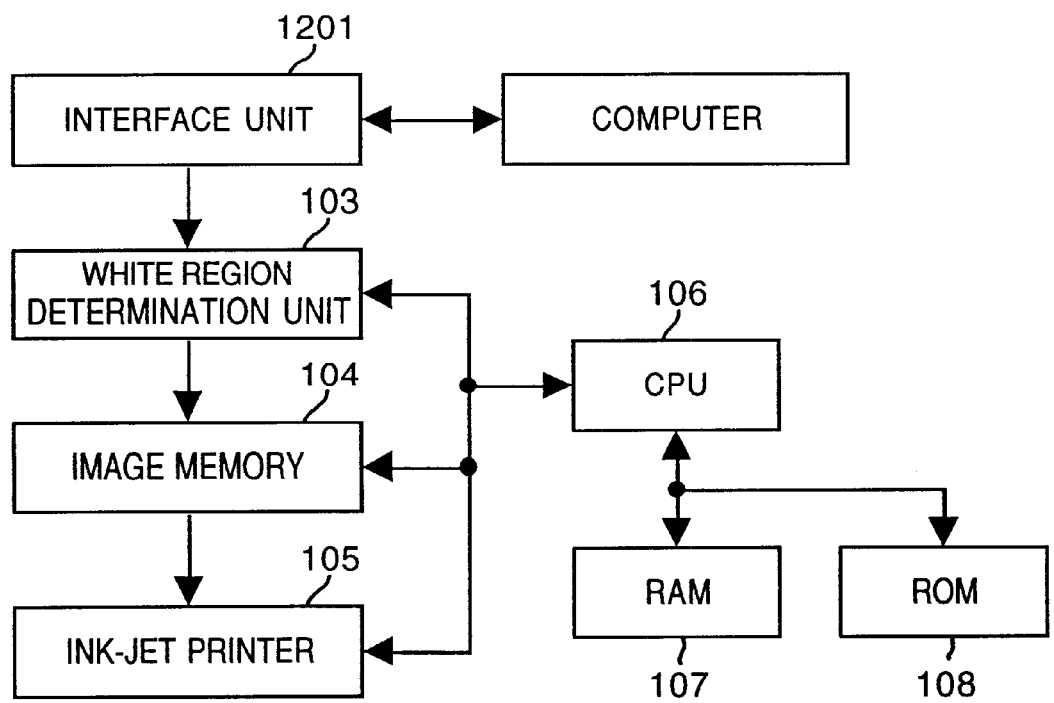
FIG. 9 is a block diagram showing a color image processing apparatus according to the second embodiment of the present invention.

The first embodiment described above exemplifies the copying machine. Desired image data are therefore read by scanning an original with the image sensing device 101. However, the present invention is not limited to this, and can be applied to an apparatus designed to receive color image data through a computer and process the received image data. An embodiment designed to process color image data received through a computer will be described below. FIG. 9 shows a printer according to the second embodiment. The same reference numerals in FIG. 9 denote the same parts as in FIG. 1 showing the first embodiment, and a detailed description thereof will be omitted.

Referring to FIG. 9, reference numeral 1201 denotes an interface unit for receiving multivalued R, G, and B data from a computer; 103, a white region determination unit 103 determining the presence/absence of a white region in the image represented by the image data received through the interface unit 1201; 104, an image memory for storing the image data; 105, an ink-jet printer for printing out a color image; 106, a CPU for controlling each component of this color image processing apparatus; 107, a RAM connected to the CPU 106 and used as a work area; and 108, a ROM connected to the CPU 106 and used to store instruction codes executed by the CPU 106.

Figure 10:
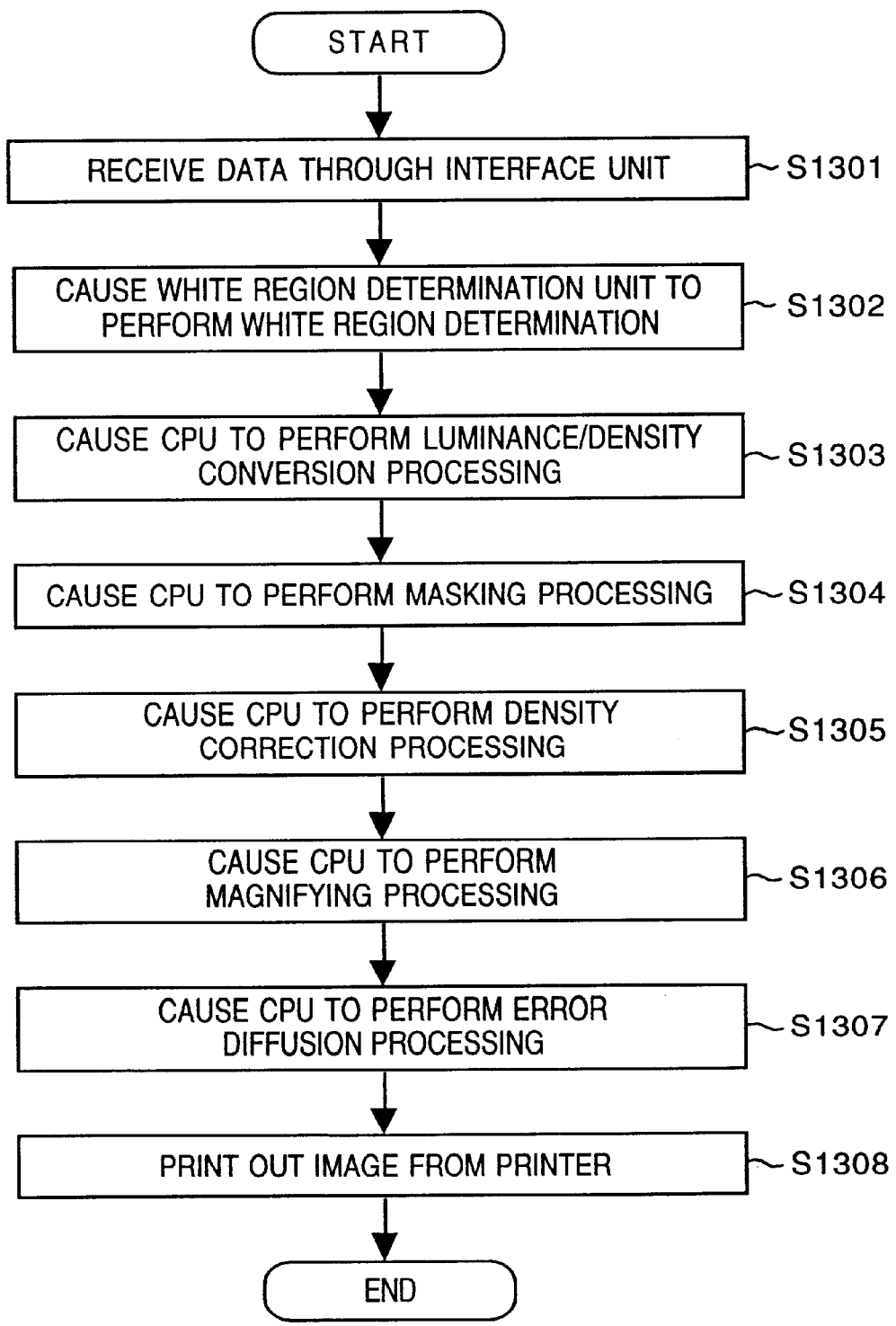
FIG. 10 is a flow chart showing the operation of the color image processing apparatus according to the second embodiment.
Figure 11:
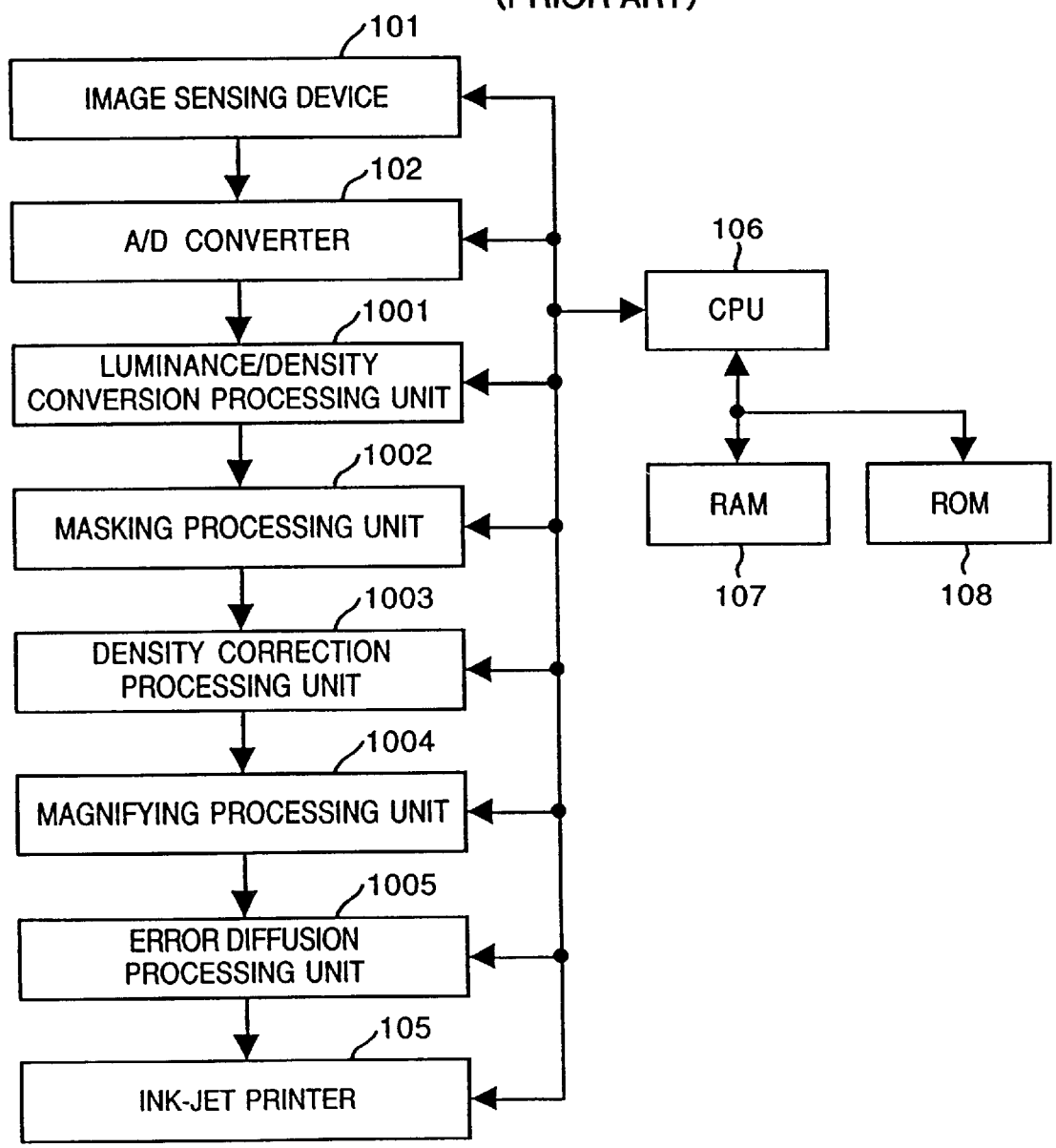
FIG. 11 is a block diagram showing a conventional color image processing apparatus.
Figure 12:
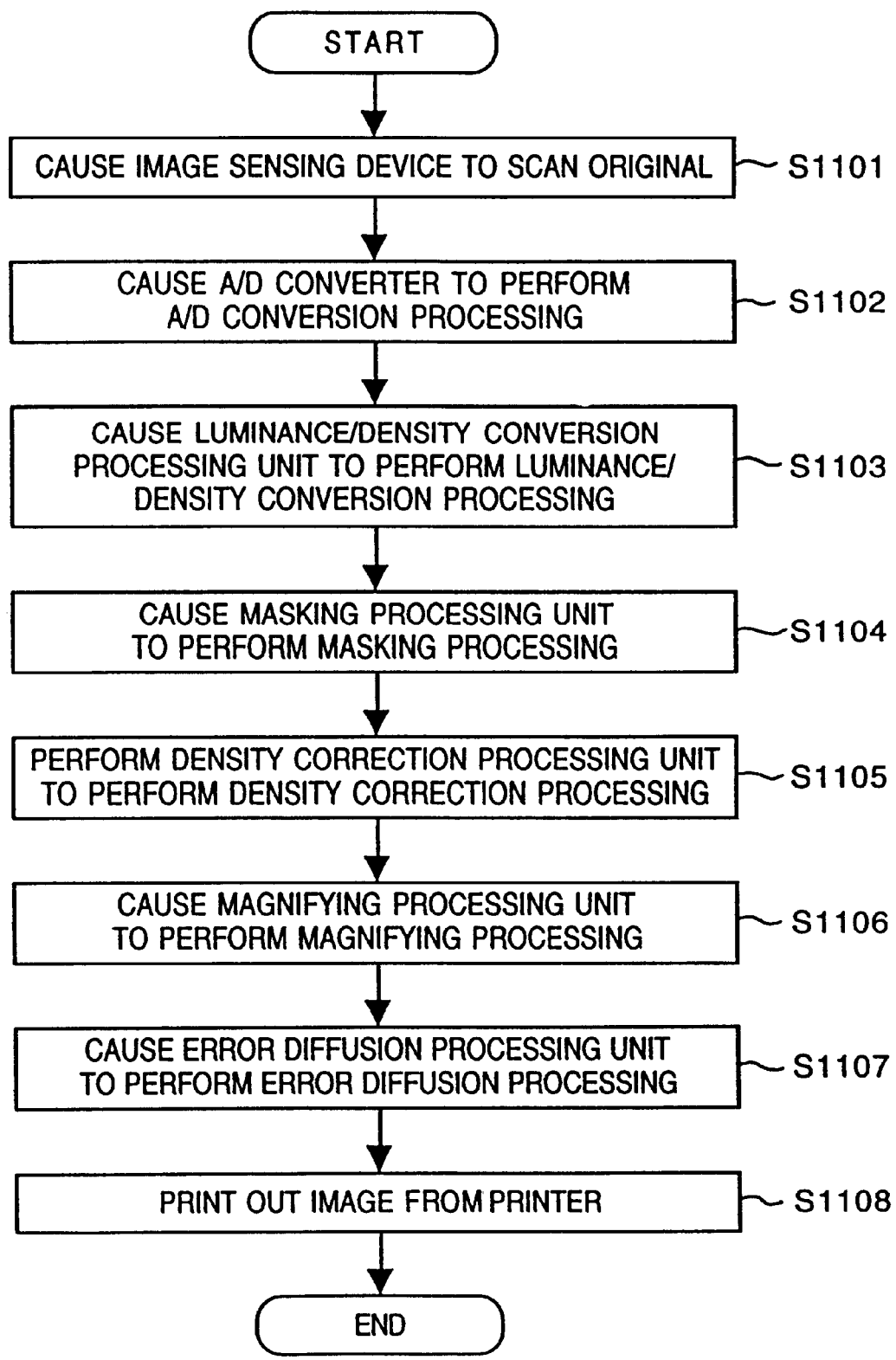
FIG. 12 is a flow chart showing the procedure of the color copying operation of the conventional color image processing apparatus.

FIG. 10 is a flow chart showing the procedure of the color copying operation of the second embodiment. The operation of the second embodiment will be described below with reference to the flow chart of FIG. 10.

First of all, R, G, and B image data input from the computer are received through the interface unit 1201 (step S1301). Although an RS232C or SCSI interface is used in this case, a different type of interface may be used.

The processing in steps S1302 to S1308 is the same as that in steps S203 to S209 in FIG. 2, and hence a detailed description thereof will be omitted.

According to the above description, masking processing is performed by a one-dimensional masking operation. However, masking processing can be performed with higher precision by a two-dimensional or higher-dimensional masking operation. In addition, magnifying processing is performed by linear interpolation. However, this processing can be simplified by using the SPC method, and another magnifying method can be used.

As described above, according to the second embodiment, the same processing as that in the first embodiment can be performed for color image data received from the computer, and the same effects as those of the first embodiment can be obtained.

Third Embodiment

The third embodiment of the present invention will be described in detail below with reference to the accompanying drawings.

Figure 13:
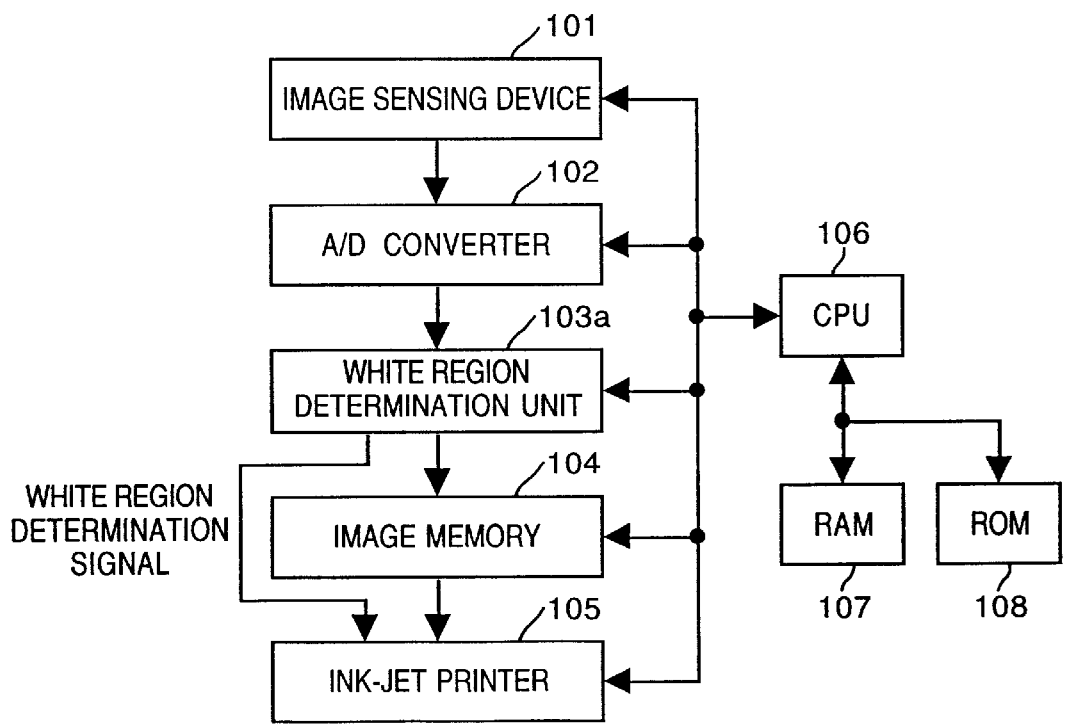
FIG. 13 is a block diagram showing a color image processing apparatus according to the third embodiment of the present invention.

FIG. 13 is a block diagram showing the arrangement of a color image processing apparatus according to this embodiment. The same reference numerals in FIG. 13 denote the same parts as in FIG. 1.

Referring to FIG. 13, reference numeral 101 denotes an image sensing device such as a CCD or the like which outputs R, G, and B analog signals by scanning an original; 102, an A/D converter for converting the analog signals output from the image sensing device 101 into corresponding digital signals; 103a: a white region determination unit for determining the presence/absence of a white region in the image represented by the image signals output from the A/D converter 102 in units of bands; 104, an image memory for storing the image signals output from the white region determination unit 103a; 105a, an ink-jet printer for printing out a color image represented by the image signals stored in the image memory 104; 106, a CPU for controlling each component of the color image processing apparatus of this embodiment and performing overall control; 107, a RAM connected to the CPU 106 and used as a work area; and 108, a ROM connected to the CPU 106 and used to store instruction codes executed by the CPU 106. Note that the ink-jet printer 105a is designed to print an image in units of bands each consisting of several lines. FIG. 8 shows this printer. When the print head having a width equal to this band width is moved in the main scanning direction, an image is printed.

Figure 14:
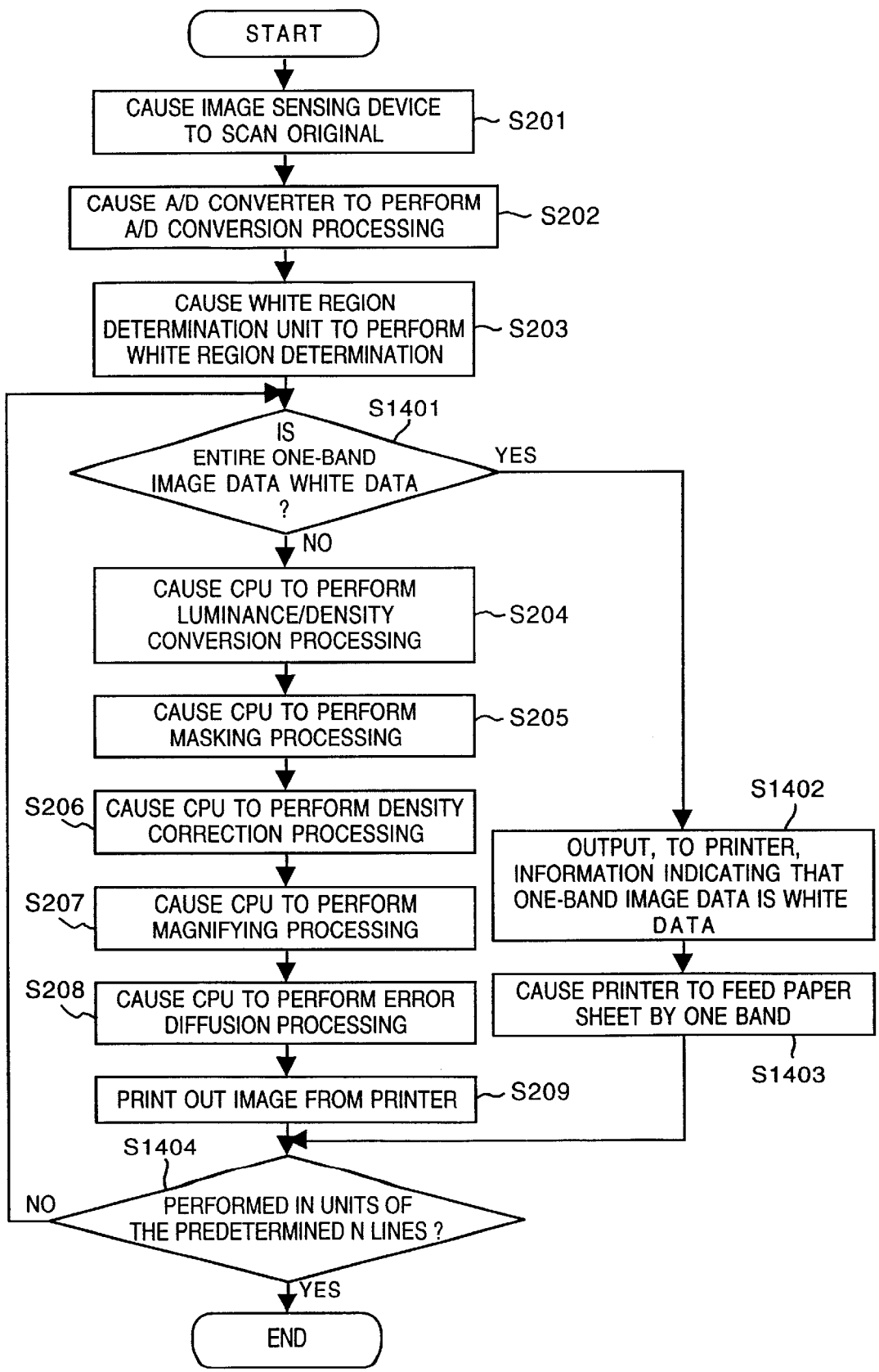
FIG. 14 is a flow chart showing the operation of the color image processing apparatus according to the third embodiment.

FIG. 14 is a flow chart showing the procedure of the color copying operation of the color image processing apparatus in FIG. 13. The color copying operation of this embodiment will be described below.

First of all, original data is read by scanning an original with the image sensing device 101, and the read data are output as analog signals (step S201). The A/D converter 102 then converts the analog signals into corresponding digital signals (step S202).

A white region in the image represented by the converted digital signals is determined (step S203).

Note that this white region determination is performed in units of bands since the ink-jet printer 105a in FIG. 13 performs a print operation in units of bands.

Since the unit of this white region determination is set to be equal to the unit of printing performed by the ink-jet printer 105a in this embodiment, white region determination performed by the ink-jet printer 105a in the first embodiment can be omitted.

The white region determination unit 103a in FIG. 13 determines whether each pixel is white. This white region determination unit 103a uses the same determination method as that in the first embodiment in FIG. 3.

In this image processing apparatus, since white region determination (step S203) before image processing is performed before image magnifying processing, one-band image data input to the white region determination unit 103a is not necessarily one-band image data input to the ink-jet printer 105a. For this reason, the one-band image data input to the ink-jet printer 105a must be calculated in advance.

The relationship between the one-band image data input to the white region determination unit 103a and the one-band image data input to the printer 105a will be described below.

If the width of one band of the printer corresponds to p lines, and the magnification set in magnifying processing is mx, the number (n) of lines before magnifying processing (when the image data is input to the white region determination unit 103a) is given by:

$$n=p/m$$

If, for example, the width of the print head of the printer 105a corresponds to 256 lines, and the magnification is 2×, the number of lines before magnifying processing (when the data input to the white region determination unit 103a) is 256/2 (=128) lines.

As described above, the white region determination unit 103a performs determination in units of n lines. If only several magnifications are set in advance in the image processing apparatus, it suffices to store units n in a memory or the like in correspondence with the magnifications. If many magnifications can be set in the apparatus, the CPU 106 may perform the above computation every time a different magnification is set.

According to this embodiment, a table in which the units n of white region determination are stored in correspondence with magnifications may be prepared to quickly set the unit n of white region determination in accordance with the magnification selected. With this table, white region determination can be efficiently performed.

In step S203, white region determination is performed according to the above unit. The flow then advances to step S1401.

If it is determined in step S1401 that all the predetermined n lines (corresponding to one band upon printing) are white, the flow advances to step S1402 to output, to the printer 105a, information indicating that "the band corresponding to the n lines undergoing determination processing is a white region".

This information is transmitted through a signal line connected between the white region determination unit 103a and the ink-jet printer 105a in FIG. 13.

Upon reception of this information, the ink-jet printer 105a skips one band indicated by the information in step S1403. That is, the paper sheet undergoing the print operation is conveyed by one band, and preparation for printing the next band is performed. The print processing for this band is then complete. Note that the processing in steps S204 to S209 is not performed in this case.

If it is determined in step S1401 that all the predetermined n lines (corresponding to one band upon printing) are not white, the flow advances to step S204.

The processing in steps S204 to S208 is the same as that in the first embodiment, and hence a description thereof will be omitted.

The processing in step S209 is the same as that in the first embodiment except that the printer 105a does not perform white region determination. That is, the one-band image data having undergone image processing in steps S204 to S208 is printed without any change.

The above processing is repeatedly performed in units of the predetermined n lines (corresponding to one band upon printing) up to the end of the original (step S1404).

The present invention can be applied to a system constituted by a plurality of devices (e.g., a host computer, an interface device, a reader, and a printer), or to an apparatus comprising a single device (e.g., a copying machine or a facsimile apparatus).

Furthermore, the present invention is not limited to the apparatuses and methods which implement the above embodiments. The present invention incorporates a case in which program codes of software for implementing the functions of the embodiments described above are supplied to the computer (CPU or MPU) of the system or apparatus, and the computer of the system or apparatus operates the above various devices, thereby implementing the embodiment.

In this case, the program codes of software themselves implement the above embodiments. The present invention therefore incorporates the program codes themselves and a means for supplying the program codes to the computer, and more specifically, a storage medium in which the program codes are stored.

As the storage medium for storing such program codes, a floppy disk, a hard disk, an optical disk, a magnetooptical disk, a CD-ROM, a magnetic tape, a nonvolatile memory card, or a ROM can be used.

The present invention incorporates the program codes in not only a case in which the computer controls the various devices in accordance with only the supplied program codes to implement the functions of the above embodiments but also a case in which the program codes implement the above embodiments in corporation with an OS (Operating System) running on the computer or other software applications.

The present invention also incorporates a case in which the supplied program codes are stored in a memory mounted on a feature expansion board inserted in the computer or a feature expansion unit connected to the computer, and thereafter, a CPU or the like mounted on the feature expansion board or feature expansion unit performs part or all the actual processing in accordance with the instructions of the program codes to implement the above embodiments.

As has been described above, according to the present invention, if there is a white region in the image represented by image data having undergone image processing and subjected to printing, image processing is omitted as much as possible, and print processing for this image data is also omitted as much as possible. With this operation, the overall time required for image processing and print processing can be greatly shortened.

In the third embodiment, in particular, since the unit of white region determination is set in consideration of the magnification in image processing and the unit of printing performed by the printer, white region determination, which must be performed in both image processing and print processing in the first and second embodiments, is required to be performed only once in image processing. Therefore, image processing and print processing can be performed at higher speeds than in the first and second embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   an image input unit for inputting image data to be processed;
   a white region determination unit for determining the presence/absence of a white region in an image represented by the input image data;
   an image processing unit for performing image processing which includes image processing regarding color tone on the input image data, said image processing unit omitting the image processing regarding color tone on the input image data in a region determined as a white region by said white region determination unit and performing the image processing including the image processing regarding color tone on the image data in a region other than the white region; and
   a printout unit for printing out an image processed by said image processing unit, said printout unit printing out the image while skipping the white region.

2. The apparatus according to claim 1, wherein said image processing unit omits luminance/density conversion processing and masking processing for the white region.

3. The apparatus according to claim 1, wherein said image processing unit omits magnifying processing, error diffusion processing, luminance/density conversion processing, and masking processing for the white region if an image level is substantially zero after density correction processing.

4. The apparatus according to claim 1, wherein said image processing unit comprises:
   a processing procedure storage unit for storing a processing procedure;
   a processing unit for performing predetermined image processing on the input image data to be processed in accordance with the processing procedure stored in said processing procedure storage unit; and a work memory for temporarily storing data processed by said processing unit.

5. The apparatus according to claim 1, wherein said printout unit is an ink-jet printer designed to skip the white region as a printout portion.

6. An image processing method for a color image processing apparatus including an image processing unit for performing image processing, which includes image processing regarding color tone, on input image data to be processed and a printout unit for printing out the input image data, comprising the steps of:

determining a white region in an image represented by the input image data, and performing the image processing, by controlling said image processing unit, so as to omit the image processing regarding color tone on the image data in a region determined as a white region and performing the image processing including the image processing regarding color tone on the input image data in a region other than the white region; and printing out the image while skipping the white region in a printout operation performed by said printout unit.

7. The method according to claim 6, wherein luminance/density conversion processing and masking processing for the white region are omitted as the image processing regarding color tone.

8. The method according to claim 6, wherein magnifying processing, error diffusion processing, luminance/density conversion processing, and masking processing on the white region are omitted as the image processing regarding color tone, if an image level is substantially zero after density correction processing.

9. An image processing apparatus for performing image processing for input image data and causing predetermined print means to perform print processing, comprising:

determination means for determining the presence/absence of a white region in an image represented by the input image data in units of predetermined unit region;

control means for performing image processing which includes image processing regarding color tone on the input image data, said control means omitting execution of at least the image processing regarding color tone on the input image data in a region determined as a white region by said determination means and performing the image processing including the image processing regarding color tone on the input image data in a region other than the white region; and output means for outputting, to the predetermined print means, information indicating that execution of the image processing regarding color tone is omitted by said control means.

10. The apparatus according to claim 9, wherein said predetermined print means comprising a printer.

11. The apparatus according to claim 9, wherein the predetermined unit region is a band in which a print head of said predetermined print means can print an image at once in a main scanning direction.

12. The apparatus according to claim 9, wherein said predetermined print means skips a band in which an image is to be printed by a print head on a basis of the information indicating that execution of the image processing regarding color tone is omitted.

13. The apparatus according to claim 9, wherein the image processing regarding color tone includes magnifying processing.

14. The apparatus according to claim 13, wherein the predetermined unit region is determined on the basis of a magnification in the magnifying processing and a band in which a print head of the predetermined print means can print an image at once in a main scanning direction.

15. An image processing method of performing general image processing which includes image processing regarding color tone for input image data and causing predetermined print means to perform print processing, comprising:

a determination step, of determining the presence/absence of a white region in an image represented by the input image data in units of predetermined unit regions;

an image processing step of performing the general image processing, of omitting execution of at least the image processing regarding color tone on the image data in a region determined as a white region in the determination step and performing the general image processing including the image processing regarding color tone on the image data in a region other than the white region; and an output step, of outputting, to the predetermined print means, information indicating that execution of the image processing regarding color tone is omitted in the image processing step.

16. A computer readable memory in which is stored program code of general image processing which includes image processing regarding color tone in a color image processing apparatus including printout means for printing out image data, said program code comprising:

code of a determination step, of determining whether an image represented by image data to be processed includes a white region;

code of an image processing step of performing the general image processing, of omitting the image processing regarding color tone on the image data in a region determined as a white region in the determination step and performing the general image processing including the image processing regarding color tone on the image data in a region other than the white region; and code of a printout step, of printing out the image while skipping the white region in a printout operation performed by said printout means.

17. The memory according to claim 16, wherein luminance/density conversion processing and masking processing for the white region are omitted as the image processing regarding color tone in said image processing step.

18. The memory according to claim 16, wherein magnifying processing, error diffusion processing, density conversion processing, and masking processing for the white region are omitted as the image processing regarding color tone in the image processing step, if an image level is substantially zero after density correction processing.

19. A computer readable memory in which is stored program code of performing general image processing, which includes image processing regarding color tone, for input image data, and causing predetermined print means to perform print processing, said program code, comprising:

code of a determination step, of determining, in units of predetermined unit regions, whether an image represented by the input image data includes a white region;

code of a image processing step, of performing the general image processing, of omitting execution of at least the image processing regarding color tone on the image data in a region determined as a white region in the determination step and performing the general image processing including the image processing regarding color tone on the image data in a region other than the white region; and code of an output step, of outputting, to the predetermined print means, information indicating that execution of at least one of the image processing regarding color tone is omitted in said image processing step.

* * * * *

UNITED STATES PATENT AND TRADEMARK OFFICE
CERTIFICATE OF CORRECTION

PATENT NO.    : 6,407,824 B1                                              Page 1 of 1
DATED         : June 18, 2002
INVENTOR(S)   : Yasunori Hashimoto It is certified that error appears in the above-identified patent and that said Letters Patent is hereby corrected as shown below:

<u>Column 12,</u>
Line 2, "corporation" should read -- cooperation --.

<u>Column 13,</u>
Line 58, "comprising" should read -- comprises --.

<u>Column 14,</u>
Line 61, "code," should read -- code --.

Signed and Sealed this

Fourteenth Day of January, 2003

JAMES E. ROGAN
*Director of the United States Patent and Trademark Office*